Dec. 2, 1952     R. B. HUNTER ET AL     2,620,464
LOAD RELAY CIRCUITS FOR INDUCTION MOTORS
Filed Aug. 31, 1944

Inventors
Richard B. Hunter
Eric Pell
Norbert L. Schmitz
By Frank H. Hubbard
Attorney Patented Dec. 2, 1952

2,620,464

UNITED STATES PATENT OFFICE 2,620,464

LOAD RELAY CIRCUITS FOR INDUCTION MOTORS

Richard B. Hunter and Eric Pell, Shorewood, and Norbert L. Schmitz, Milwaukee, Wis., assignors to Cutler-Hammer, Inc., Milwaukee, Wis., a corporation of Delaware Application August 31, 1944, Serial No. 552,046

1 Claim. (Cl. 318—490)

This invention relates to load relay circuits for induction motor systems.

Where a current relay is employed in connection with an induction motor for measuring loads it is in some instances important that the relay be free from the influence of certain of the components of the total primary current, and it is an object of the present invention to provide a relay circuit effective to protect the relay against such undesirable influence.

More particularly the invention has among its objects to provide a relay circuit which will free the relay from the influence of such components as the magnetizing current and the no load current, thereby to render the relay controllable substantially exclusively by the load component of the total primary current.

Another object is to provide such a relay circuit especially advantageous for use in hoisting and lowering systems where high speed lowering of a light load is desired and where the load measuring means relied upon must be reliable and accurate.

Other objects and advantages of the invention will hereinafter appear.

The accompanying drawing illustrates certain embodiments of the invention which will now be described, it being understood that the embodiments illustrated are susceptible of various modifications without departing from the scope of the appended claim.

Figure 1:
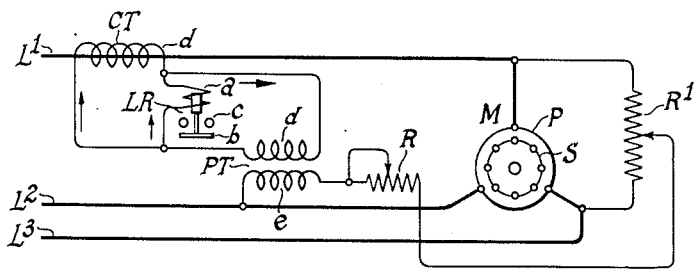
Figure 1 shows a preferred load relay circuit.

Referring to Fig. 1, the same shows an induction motor M having a primary P and a secondary S which may be of the slip ring type or of the squirrel cage type. The primary of the motor is shown as supplied with power from lines $L^1$, $L^2$ and $L^3$, the usual means for controlling the power connections being omitted for simplicity of illustration. As will be understood, the motor secondary if of the slip ring type may be provided with control of any of various well known types.

Further referring to Fig. 1, it shows a load relay LR which may be of any suitable construction. For simplicity of illustration the load relay is shown diagrammatically as comprising a winding $a$ responsive to lift a movable contact element $b$ which has associated therewith stationary contacts $c$ to be bridge thereby. As shown the contacts $c$ are adapted to be bridged by element $b$ upon response of the winding $a$, but as will be understood the contacts $c$ might be normally bridged by the element $b$ and disengaged thereby upon response of winding $a$. The winding $a$ is shown as connected across a closed loop having included therein the secondary windings $d$ of a current transformer CT and a potential transformer PT. The primary winding $e$ of the potential transformer is shown as connected through an adjustable resistor R to a potentiometer type rheostat $R^1$, the resistor of which has its end terminals connected to lines $L^1$ and $L^3$, respectively. While such is the preferred connection of the secondary winding of potential transformer PT said winding might alternatively be connected across lines $L^2$, $L^1$ through the adjustable resistor R, this connection being like that of the relay winding of Fig. 3.

Figure 5:
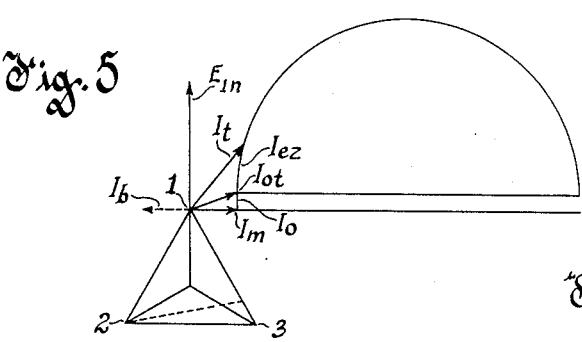
Fig. 5 shows the voltage and current relations of one phase of an induction motor.

As will be understood, the current transformer CT tends to subject the winding $a$ of the load relay to a current proportional to the total primary current, whereas it is the purpose of the potential transformer PT to free the relay winding from the influence of the undesirable components of the total primary current. Reference will now be made to Fig. 5 in further explaining the circuit described.

In Fig. 5 the triangle 1, 2, 3 represents the line and phase to neutral voltages, $I_m$ the magnetizing current at rated voltage, $I_o$ the no load loss and $I_{ot}$ the no load total primary current, $I_{ez}$ the load component of the current for a certain load and $I_t$ the total primary current at such load, $I_t$ being the sum of all aforementioned components. The phase to neutral voltage of phase 1 is represented by the vector $E_{1n}$ and the magnetizing current $I_m$ of this phase is lagging such voltage by 90 degrees. To buck out this magnetizing component $I_m$ there is depicted an equal and oppositely directly component $I_b$.

The vector relations of Fig. 5 apply to Fig. 1 and the potential transformer is provided to supply the aforementioned component $I_b$ to free the relay winding of influence by the magnetizing current component $I_m$. The potential transformer may be caused to so function by connecting its primary winding as shown or by connecting its primary winding across lines $L^2$ and $L^1$ through adjustable resistor R as aforementioned.

On the other hand, the relay circuit, inclusive of the potentiometer type rheostat $R^1$ enables utilization of the potential transformer to buck out the magnetizing current component and also some of the load component. The adjustable resistors in the potential portion of the circuit can, for example, be adjusted for bucking out the no load current $I_{ot}$. The current flowing through the relay winding $a$ will be equal to the difference between the total primary current and the bucking component obtained from the potential transformer, and thus the relay will be rendered effective to measure and will be responsive to the load component of the primary current.

Figure 2:
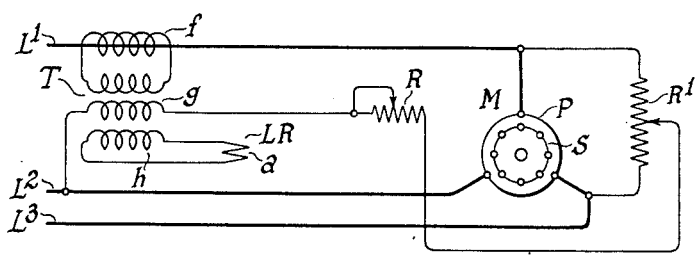
Figs. 2, 3 and 4 show certain possible modifications of the circuit shown in Fig. 1.

In Fig. 2 the potential transformer has been replaced by a so-called mixing transformer T. This transformer has a current coil $f$, a winding $g$ connected at one end to line $L^2$ and at its other end through an adjustable rheostat R to a potentiometer type rheostat $R^1$, and a winding $h$ connected in a closed loop with the winding $a$ of the load relay. In this instance the flux of the line current from the current transformer is partially bucked out by the flux of a voltage in a manner identical to that of Fig. 1. The resultant load component of the flux induces a current in the winding $h$ for control of the load relay. In this instance also it would be possible to obtain satisfactory results in some instances by connecting the winding $g$ across lines $L^2$ and $L^1$ through adjustable resistor R instead of connecting said winding to the potentiometer type rheostat.

Figure 3:
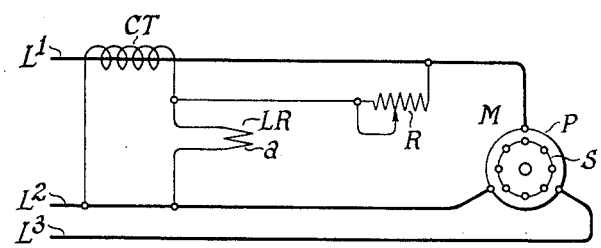

In Fig. 3 the potential transformer is omitted and the bucking component is obtained directly from the lines using a suitably adjusted resistor R. Alternatively this circuit might include the potentiometer type rheostat $R^1$, in which event the connection to line $L^1$ would be dispensed with, the lead from resistor R being shifted to the adjustable element of the rheostat $R^1$.

Figure 4:
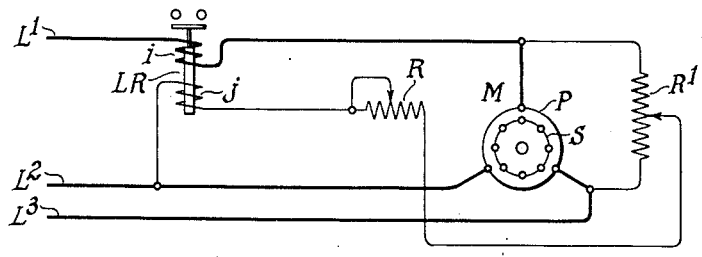

In Fig. 4 there is shown a special load relay having two coils $i$ and $j$ in which the fluxes of the line current and the bucking current are mixed to produce a resultant load component for control of the relay. The winding $i$ is included in circuit between line $L^1$ and one terminal of the motor primary, while winding $j$ has one terminal connected to line $L^2$ and its opposite terminal connected through adjustable resistor R to a potentiometer type rheostat $R^1$ like that of Figs. 1 and 2 and similarly connected. Alternatively the winding $j$ might be connected across lines $L^2$ and $L^1$ through adjustable resistor R, as in the case of the load relay winding of Fig. 3. The principle of operation of such a two coil relay is the same as that of the forms aforediscussed.

What we claim as new and desire to secure by Letters Patent is:

In combination, a polyphase motor, a polyphase alternating current supply therefor, a single coil current relay, a current transformer deriving from one phase of the motor primary a first current, a transformer producing a second current proportional to the voltage across two terminals of the motor primary, means for adjusting said second current to bear a given relation to certain of the current components of the motor primary, and a closed loop including the secondary windings of said transformers and having the coil of said relay connected across it between said included transformer windings to subject said coil to the direct resultant of said first current bucked by said second current and thereby to render said relay sensitive to the load component of the motor primary with certain of the current components of the motor primary bucked out according to the adjustment of said second current.

RICHARD B. HUNTER.
ERIC PELL.
NORBERT L. SCHMITZ.

REFERENCES CITED

The following references are of record in the file of this patent:

UNITED STATES PATENTS

| Number | Name | Date |
| --- | --- | --- |
| 910,676 | Hansen | Jan. 26, 1909 |
| 1,072,132 | Lutz | Sept. 2, 1913 |
| 1,292,585 | Crichton | Jan. 28, 1919 |
| 1,461,551 | Macmillan | July 19, 1923 |
| 1,640,547 | Kincaid | Aug. 30, 1927 |
| 1,709,687 | Schachtmeyer et al. | Apr. 16, 1929 |
| 1,860,489 | Williamson | May 31, 1932 |
| 1,991,035 | Werner | Feb. 12, 1935 |
| 2,117,839 | Chubb | May 17, 1938 |
| 2,247,506 | Kutcher et al. | July 1, 1941 |
| 2,289,920 | Lennox | July 14, 1942 |
| 2,406,781 | Lewis | Sept. 3, 1946 |
| 2,458,454 | Winther | Jan. 4, 1949 |
| 2,498,057 | Winther | Feb. 21, 1950 |

FOREIGN PATENTS

| Number | Country | Date |
| --- | --- | --- |
| 482,433 | France | Dec. 26, 1916 |